June 19, 1962   A. J. FRISTOT   3,039,220
ARTIFICIAL DAHLIA-LIKE FLOWER
Filed April 10, 1961
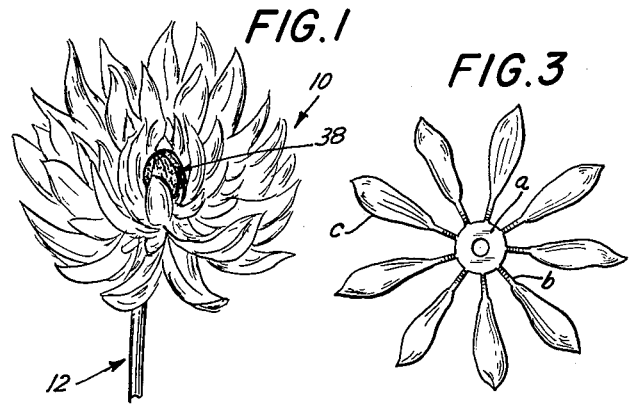
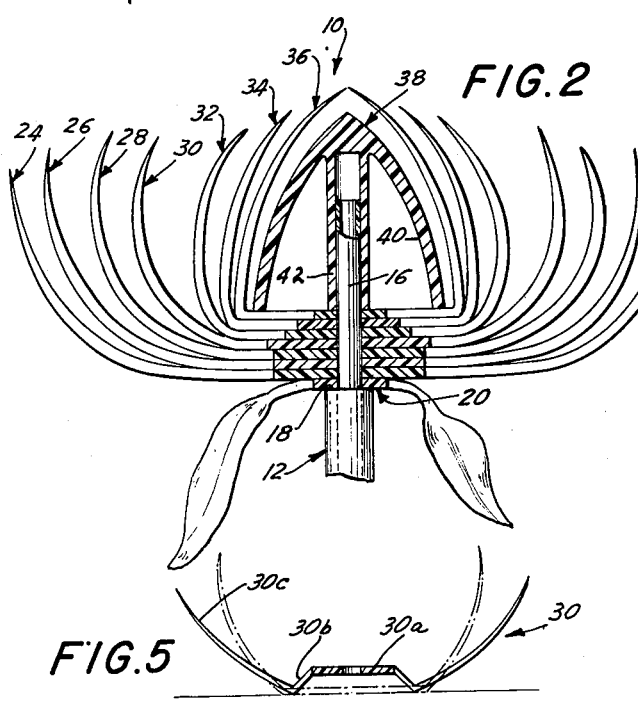
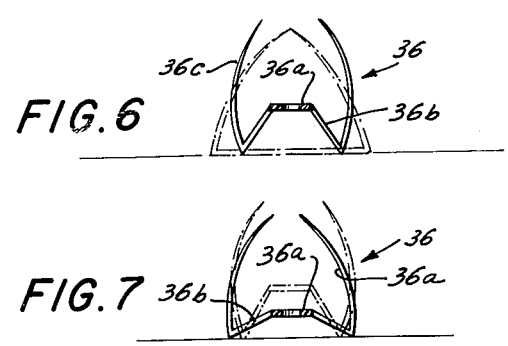
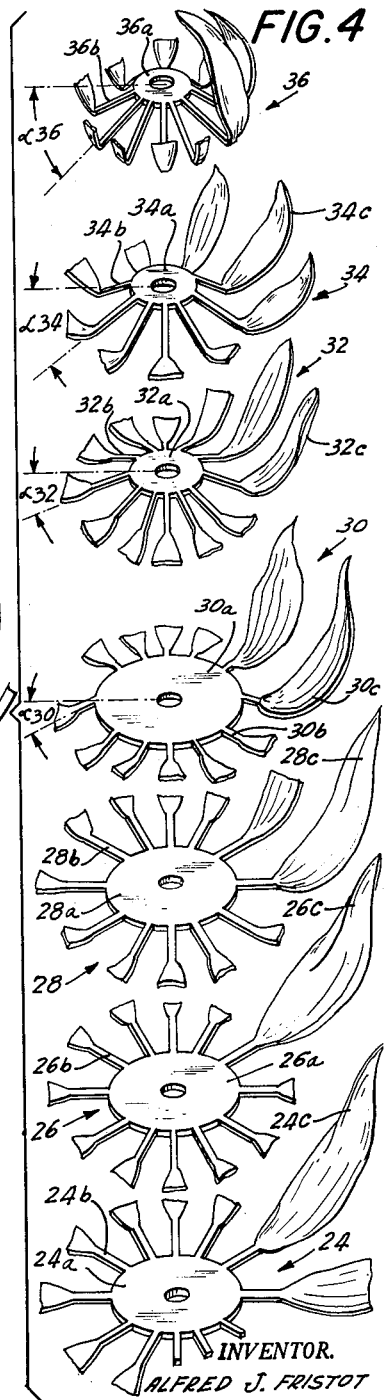
INVENTOR.
ALFRED J. FRISTOT
BY Kane Dalsimer and Kane
ATTORNEYS … # 3,039,220
ARTIFICIAL DAHLIA-LIKE FLOWER
Alfred Jean Fristot, 21 Ave. du Camp, Fontaines
a/Saone (Rhone), France
Filed Apr. 10, 1961, Ser. No. 102,049
Claims priority, application France Sept. 12, 1960
4 Claims. (Cl. 41—13)

This invention relates to the manufacture of artificial flowers and, more particularly, to the manufacture and construction of articles simulating natural flowers possessing a multiplicity of petals.

As ordinary observation will reveal, a number of natural flowers, as for example, dahlias, produce a growth or bloom of an appreciable quantity of petals. At a stage of the blooming process, the petals are progressively detached from the heart of the flower to a point at which the outer periphery or row of petals extends radially from and substantially normal to the flower stem. Under such circumstances, the smallest and most slender of the petals embrace and surround the heart of the flower with the largest and most developed forming the outer petal rows, which are furthest from the central nucleus. This type of blooming could popularly be termed "artichoke-like."

The principle object of the present invention is to accordingly provide an artificial flower possessing an identical effect and producing the same impression upon the minds of the ordinary observers, while simultaneously satisfying the most technical parameters most stringent economic criteria and enabling a simple injection molding process to be employed.

A further object is to provide a multiple petal flower construction and fabrication process from resinous material through injection molding by requiring a minimum number of injections and simplest of mold designs, while, at the same time, permitting the so-called "artichoke-like" type of blooming to be effectively produced.

Another important object is to provide artificial flowers with multiple petals and an improved method for their manufacture such that a superior and natural bloom appearance is attained by varying the relationship between the petals of a particular row and their mounting base during the molding operation, as well as during the assembly of the bloom components, for purposes of proximating full closure of the petals, particularly the innermost ones about the nucleus or heart of the flower, thereby eliminating the necessity for other than a two-part mold.

Thus, the present invention contemplates the employment of a two-piece die cavity for the injection molding of a multiple petal artificial flower formed from a number of integrally formed petal units. Each of these petal units includes a central disc, from which extends radially a plurality of petal stems molded to form a predetermined angle with the plane of the central disc. The petals then form integral extensions of the associated stems. The angle between the petal stems and the mounting central disc will progressively increase as the petals of the unit are intended to be disposed further from the heart of the flower. The units constituting the outer rows of petals will, consequently, be molded with the petal stems that are substantially planar with the mounting disc.

The individual units may be molded with progressively smaller petals as the units are to be placed adjacent the flower center. Of significance is the provision for increasing the angle defined by the petal stems and the disc of the individual flower units through the appliaction of a corresponding amount of pressure so that a substantially coplanar relationship is obtained. To this end, the petals of the stems thus displaced will shift inwardly towards the heart of the flower such that the inner petals will embrace it in a manner and form such that the selected flower is simulated. In this manner, it will be fully understood that a four-part mold effect is obtained through the use of only a two-part injection mold and subsequent application of pressure to alter the angle between the central mounting disc and projecting petal stems.

Other objects and advantages will become apparent from the following detailed description of one of the preferred applications of the teachings of the present invention, which is illustrated in the accompanying drawings in which:

FIG. 1 is a perspective view of an artificial flower simulating a dahlia, in accordance with the present invention;

FIG. 2 is a sectional view taken through the heart of the flower of FIG. 1;

FIG. 3 is a top plan view of a petal unit constituting one of the several individually formed units constituting the selected flower;

FIG. 4 is an exploded view, with certain parts broken away and removed, of the petal units that are ultimately placed in the relative locations, illustrated in FIG. 2, to form the flower illustrated in FIG. 1;

FIG. 5 is a fragmentary sectional view of a freshly molded petal unit which will be eventually placed furthest from the heart of the flower to be formed while still possessing the teachings of the invention;

FIG. 6 is a similar fragmentary sectional view of another petal unit in its molded form and which will be placed nearest the central nucleus with phantom lines depicting the optimum deflection of its petal stems relative to the mounting central disc such that the projecting petals will tightly embrace the heart of the flower; and FIG. 7 is a fragmentary sectional view of the same petal unit in a partially deformed or pressurized state by traversal through a deformation originating with the form depicted by phantom lines.

It should be understood, initially, that the present invention is applicable to the fabrication of many artificial flowers although the several views herein illustrate a dahlia. Under such circumstances, the simulated dahlia will include the flower corolla 10 in bloom on stem 12. The stem 12 may be of integral construction, as illustrated or, formed with an imbedded wire extending longitudinally therethrough. The upper end of the stem 12 is somewhat reduced in radius along the sector 16 and, accordingly, will present a circumferentially extending shoulder 18. A calyx simulating unit 20 is formed with a bored central disc portion, which conveniently rests on the shoulder 18 and which, additionally, includes the usual integrally extending sepals.

The flower corolla 10 is essentially represented by petal units 24, 26, 28, 30, 32 and 34, as they appear respectively in a radially inward direction towards the heart or inverted conical plug member serving as the central nucleus 38 of the flower. Each of the petal units will include a bored central base or disc $a$, from which extends radial fingers or petal stems $b$ having at their associated and integral peripheral ends simulated petals $c$.

Since it is desired to provide a cluster of petals resembling a corolla 10 in bloom, the petals $c$ should be randomly disposed but disbursed throughout the bloom in a controlled manner. Thus, the petal units 24, 26 and 28 will preferably have their respective petal stems or fingers $b$ substantially planar with their supporting central base or disc $a$. However, the mold for such flower units may respectively provide for a greater arcuate divergent from the plane of the central disc $a$ for the laterally extending simulated petals $c$ and, at the same time, may provide for smaller or reduced-in-size petals $c$, as is usually the case with a natural bloom of this sort.

Starting with the petal unit 30 and progressing inwardly to the eventual petal unit 36, the teachings of the present invention become more significant, bearing in mind that the more complex four-part mold is being avoided in favor of the simpler two-part assembly. As will be observed in FIG. 5, the petal stems or fingers $b$ form an angle $\alpha_{30}$ with the central disc $a$ of a magnitude approaching about 90°. Naturally, this angle $\alpha_{30}$ will be less than 90° and, for most practical commercial application, will represent a maximum angle of about 89.9°.

When the bore in the central disc $a$ of this petal unit 30 receives the reduced end 16 of the main stem 12 and pressure is applied to the central disc 30a by the relative shifting of the heart 38, the petal finger will be actuated relative to the central disc 30a to increase the angle $\alpha_{30}$ which will approach 90° and the fingers $b$ and central disc 30a will tend to become co-planar. Under the circumstances, a camming action is one of the contributing factors to this relative movement of the component parts of the petal unit 30 as the outer ends of the fingers 30b slide along the engaged surfaces of the immediately adjacent lower petal unit 28 under the influence of pressure exerted on the central base 30a resulting from the shifting of the heart 38. This resultant flattening of the juncture between the fingers 30b and the central disc 30a and consequent increase in the angle $\alpha_{30}$ will cause the petals 30c to shift radially inwardly to eventually assume the dotted line position illustrated in FIG. 5.

The angle $\alpha$ of the successive petal units 32 and 34 will be decreased proportionately depending upon the desired orientation of the respective petals $c$ in the assembled artificial flower corolla 10. In this connection, the upper petal unit 36 will possess an angle $\alpha_{36}$ which will be in the neighborhood of zero degrees but slightly larger for most workable commercial applications. It has been found that this angle $\alpha_{36}$ will probably be equal to or exceed 0.2 degree in order to obtain the desired shifting of the petal units 36c radially inwardly about the heart 38.

When pressure is exerted against the central base 36a directly by the heart 38, the angle $\alpha_{36}$ will increase. It will be appreciated the shifting of the heart 38 relative to the reduced stem section 16 is selectable such that the angle $\alpha_{36}$ need not be approximately equal to 90 degrees but may be somewhat less again depending upon the extent of embracing desire of the heart 38 by the petals 36c. In FIGURE 6 the dotted line representation indicates an increase in $\alpha_{36}$ of about 90 degrees with the petals 36c being proximate surfaces of the heart 38. However, in FIGURE 7 the dotted line representation of the petal unit 36 should indicate that only a partial flattening has been induced with the result that the angle $\alpha_{36}$ is between zero and 90 degrees and the petals 36c somewhat spaced from the surfaces of the heart 38. Naturally, the angles $\alpha_{32}$ and $\alpha_{34}$ can be similarly adjusted between their molded value and their maximum by relatively shifting the heart 38 on the reduced stem section 16.

Referring now to the details of the structure of the heart 38, it will be noted that the outer surfaces of the body portion 40 are substantially hemispherical in configuration for purposes of simulating the heart of the flower intended to be represented artifically. A coaxial tube 42 integral with said cap is located interiorly of this body portion 40 and serves to telescopically receive the reduced section 16 of the flower stem 12. The friction existing between the mated parts permits only deliberate relative sliding movement on the reduced section 16 for purposes of exerting the desired degree of pressure on the central base 36a of the innermost petal unit 36 to obtain the selected blooming effect for the flower corolla 10. In this connection, FIG. 2 illustrates the maximum relative displacement between the tube 42 and reduced section 16 and accompanying pressure on the central base 36a, bearing in mind that heart 38 need only be retracted to conveniently alter the bloom.

As can be appreciated, each of the petals of the units 24–36 together with the other components with the exclusion of the wire may be fabricated by a single injection of resinous material in a mold. All of the petals in a given row, as they would probably appear naturally, are of the same size. The rows of petals, however, will increase in size as the distance of their intended position from the central nucleus 38 increases. As previously explained, the $\alpha$ angle for orienting the petals for the selected bloom effects can be increased progressively from 0.2° to 89.9° within the entire range possible between these two figures.

Of significance is the contribution of provisions for only a single injection per row of petals. In addition, the mold which is to receive this injection must be constructed as simply as possible, which is definitely the case herein. In the present case, this mold will be formed essentially of two parts, both the male and female, as can be clearly seen by visualization of the illustrative rows of petals prior to the squeezing of the petal units 24–36 on the reduced section 16 of the flower stem 12 by the central nucleus 38. As will be understood by those skilled in the art, the position assumed by the petals of the units subsequent to the application of pressure by the nucleus 38 would, out of necessity and practicality, be otherwise fabricated, in most instances, without the benefit of the teachings of the present invention by the employment of a four-part mold.

It has been found that for an angle of $\alpha$ below 0.2°, the squeezing effect on the central base $a$ for such petal units may cause deformation or an accordion shaping of the associated fingers or petal stems $b$. Above 89.9° for the value selected for the angle $\alpha$ would not cause any significant movement of the petals of such unit at the time the squeezing effect is exerted on the particular central base by the heart 38 of the flower.

The above-mentioned squeezing effect on the central base $a$ of a particular petal unit will, as a result of pressure exerted by the shifting of the heart 38, bring or articulate the fingers $b$ from their initial, more or less flaring conical position to a planar position coinciding substantially with that of the central base $a$. In this stage, the fingers $b$ will extend the petals $c$ in a direction at which they will assume, in space, their final position and the structure of the flower simulated according to the previously anticipated arrangement. Thus, the more the cone formed by the fingers $b$ is closed and tends to take on the shape of a cylinder, the more closed will be the row of petals when the flower is assembled or mounted, assuming a constant angle between the fingers $b$ and petal extensions $c$. The foregoing will render it possible to obtain, by means of several rows of petals of certain selected sizes, an artificial flower with a simulated bloom resembling that of the natural flower it seems to reproduce.

Although a single preferred embodiment of the present invention has been disclosed and described herein, the invention is in no sense limited thereby. Since the aforedefined objects and advantages have been most effectively attained, the scope of the invention is to be taken and determined by the appended claims.

I claim:

1. An artificial dahlia-type flower comprising a plurality of similar plastic flower petal units in stacked relation, each of said petal units having an axially bored central disc and a plurality of spaced fingers extending radially outwardly from the circumference of each disc and being integral therewith, a flower petal element supported at its base by each finger and being integral therewith to extend beyond said finger and define a generally circular periphery which with the petals from other stacked units presents a dahlia-like shape, a stem passing through all of the bores of each of said units and projecting at its upper end beyond the uppermost petal unit of the stack, the effective diameter of a lower flower petal unit in the stack being greater than the effective diameter of the upper flower petal unit in the stack, an inverted conical plug mounted over the end of said stem pressing against the top of the stack of petal units which places the fingers of each petal unit under pressure while the greater diameter in the lower unit permits a camming action under the pressure of said mounted plug to move the upper petal elements inwardly and upwardly with respect to said plug thereby having said plug simulate the central nucleus defining the heart of the dahlia shape with the petal elements surrounding the heart.

2. The flower as claimed in claim 1 wherein said conical plug is formed on its inside with an integral centrally located vertical tubular member for shiftably mounting said plug over the upper end of said stem, said tubular member extending to the bottom of the plug thereby facilitating the pressing action of said plug against the stacked flower petal units.

3. The flower as claimed in claim 1 wherein said flower petal unit is molded plastic formed in one piece.

4. The flower as claimed in claim 1 where the fingers of the upper petal units normally extend slightly downwardly from the central disc when not under pressure by said plug and said petal elements extend generally upwardly from said fingers.

References Cited in the file of this patent
UNITED STATES PATENTS 2,881,545     Decamp _____ Apr. 14, 1959

FOREIGN PATENTS 552,497     Canada _____ Feb. 4, 1958
798,175     Great Britain _____ July 16, 1958